Feb. 27, 1923.
P. J. ETUE
GATE
Filed Feb. 28, 1921
1,447,016
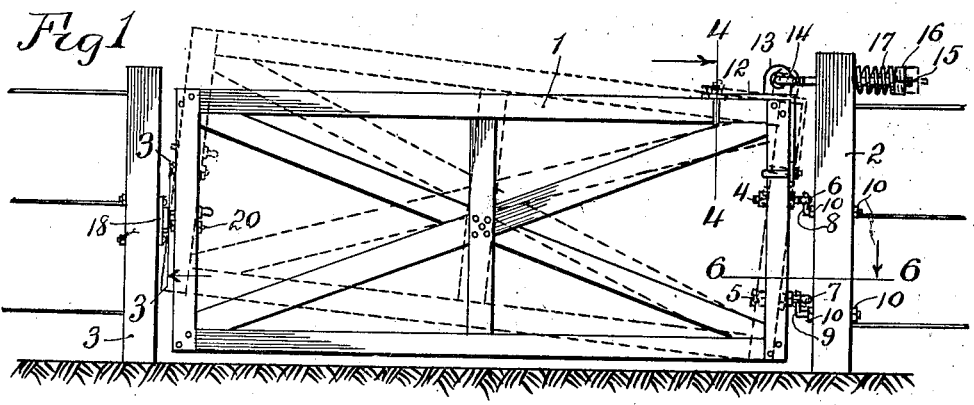
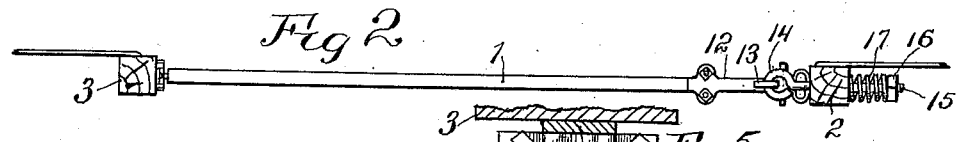
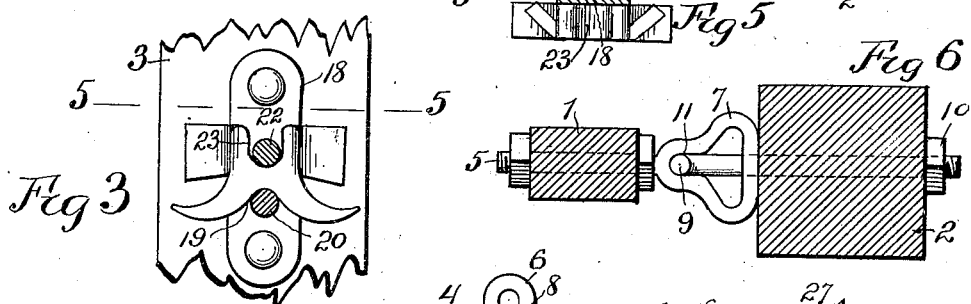
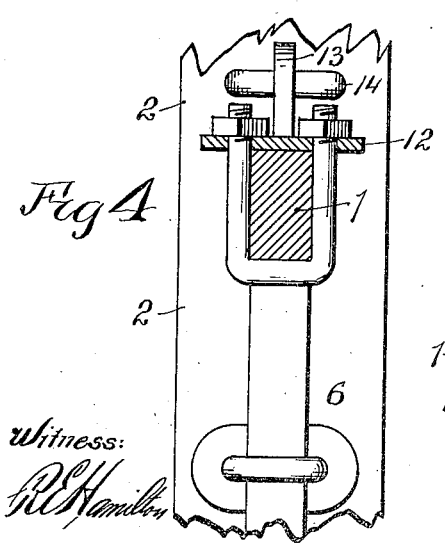
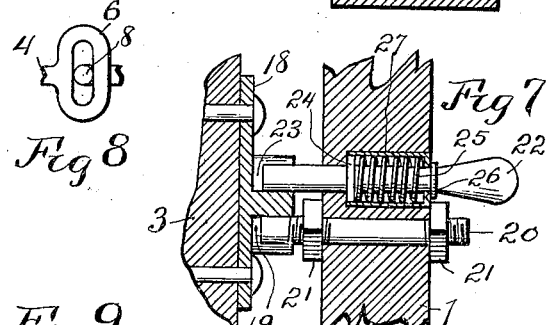
Inventor:
Peter J. Etue
By Warren W. House,
His Attorney.
Witness:
R. E. Hamilton Patented Feb. 27, 1923.

1,447,016

UNITED STATES PATENT OFFICE.

PETER J. ETUE, OF MERRIAM, KANSAS.

GATE.

Application filed February 28, 1921. Serial No. 448,426.

*To all whom it may concern:*

Be it known that I, PETER J. ETUE, a citizen of the United States, residing at Merriam, in the county of Johnson and State of Kansas, have invented a certain new and useful Improvement in Gates, of which the following is a specification.

My invention relates to improvements in gates.

The object of my invention is to provide a gate with means for supporting it such that the gate, in swinging from the closed or open position, will clear snow and other obstructions which may be in the line of its path of movement. My invention further provides novel locking means which is simple, cheap to make, easily operated, secure, durable, not liable to get out of order and which is efficient in operation.

A further object of my invention is to provide novel supporting and locking means which may be applied to wooden or iron gates and to gates now in use.

The novel features of my invention are hereinafter fully described and claimed.

In the accompanying drawing which illustrates the preferred embodiment of my invention, Fig. 1 is a side elevation of my improved gate shown in solid lines in the locked closed position, and in dotted lines in the upwardly tilted position.

Fig. 2 is a top view of the gate.

Fig. 3 is an enlarged vertical section on the line 3—3 of Fig. 1.

Fig. 4 is an enlarged cross section on the line 4—4 of Fig. 1.

Fig. 5 is a horizontal section on the line 5—5 of Fig. 3.

Fig. 6 is a horizontal section on the line 6—6 of Fig. 1.

Fig. 7 is a vertical section on the line 7—7 of Fig. 3.

Fig. 8 is an enlarged top view of one of the supporting pivots.

Fig. 9 is an enlarged top view of a portion of the gate and parts connected therewith.

Similar reference characters designate similar parts in the different views.

1 designates the frame, preferably rigid, such as is ordinarily employed in gate construction. 2 designates the usual post upon which the gate is swung and 3 the post with which the gate is adapted to be lockingly engaged.

For pivotally supporting the frame 1, the latter has mounted in it at one end two horizontal bolts 4 and 5, disposed one above the other and provided respectively with horizontal eyes 6 and 7 in which are respectively pivotally mounted the upstanding ends of two bolts 8 and 9, each of which is right angled and has its horizontal portion extending through the post 2 to which it is clamped by nuts 10, which respectively embrace opposite sides of said post.

Each of the eyes 6 and 7 is transversely elongated to permit of lateral movement on the bolts 8 and 9 respectively. The eye 7, as shown in Fig. 6, is provided with a recess 11, which will permit the frame 1 to swing from the position shown in Fig. 6, and in solid lines in Fig. 1, to the position shown in dotted lines shown in Fig. 1.

For normally tilting the frame 1 to the position shown in dotted lines in Fig. 1, the frame 1 has mounted upon its right hand upper corner, as viewed in Fig. 1, a bracket 12 provided with an upstanding eye 13 which engages and is laterally slidable on a horizontal eye 14 provided on the adjacent end of a bolt 15 which is horizontally slidable in a hole provided in post 2, and which has mounted upon its other end a nut 16, against which bears one end of a coil spring 17, which encircles the bolt 15 and the other end of which bears against the post 2. The tension of the spring 17 is such that it will normally force the bolt 15 to the right, as viewed in Fig. 1, thereby normally tilting the frame 1 upwardly to the position shown in dotted lines in Fig. 1.

Rigidly fastened to the post 3 on the side thereof adjacent to the frame 1, is a plate 18 provided with a downwardly facing notch 19, Fig. 3, which is adapted to receive therein the adjacent projecting end of a bolt or pin 20, which is mounted horizontally in the adjacent end of the frame 1 to which it is rigidly clamped by means of nuts 21 which bear respectively against opposite sides of the frame 1.

When the frame 1 is swung to the closed position and has its free end sufficiently depressed and then permitted to rise, the pin 20 will enter the notch 19, thereby holding the frame 1 from tilting upwardly and from lateral swinging in either direction.

To releasably lock the frame in the closed position, just described, and to hold the frame from being accidentally forced downwardly, so that the pin 20 can escape from the notch 19, I provide suitable releasable means consisting preferably in a manually slidable pin 22, Fig. 7, which is horizontally slidable in the frame 1 to and from a position in which it will enter an upwardly facing notch 23 provided in the plate 18 directly above the notch 19, see Figs. 3 and 7.

Encircling the pin 22 and bearing at one end against an annular flange 24 on the pin 22 is a coil spring 25, the other end of which bears against an annular inwardly extending flange 26 provided in a horizontal tube 27, which is mounted in the frame 1.

In the operation of my invention, to open the gate, the pin 22 is pulled out of the notch 23, and the adjacent end of the gate is then depressed and swung to clear the pin 20 of the notch 19, after which the spring 17 will tilt the frame to the position shown in dotted lines in Fig. 1. The frame may then be swung in either direction to the open position in which operation, the eye 13 will travel laterally on the eye 14 to the position shown in dotted lines in Fig. 9, when the frame is swung in one direction, in which position of the frame the tension of the spring 17 will tend to hold the frame in the open position.

When the gate is to be closed, the frame is swung from the open position to near the closed position and is then depressed and then permitted to rise, so that the pin 20 enters the notch 19. The spring 25 will then force the pin 22 into the notch 23, thereby locking the gate in the closed position.

The tilted position of the gate, when it is unlocked and released from the plate 18, permits the gate to swing clear of obstructions, such as might otherwise obstruct it.

I do not limit my invention to the structure shown and described, as modifications, within the scope of the appended claims, may be made without departing from the spirit of my invention.

What I claim is:

1. The combination with a gate and a post, of means by which the gate is pivotally supported on said post so as to swing vertically and laterally, a bolt horizontally slidable in said post and pivotally engaging said gate above the pivotal support of the latter, and a spring bearing against the post and against said bolt, whereby the gate is normally upwardly tilted, substantially as set forth.

2. The combination with a gate and a post, of means by which the gate is supported on said post so as to swing vertically and laterally, a bolt horizontally slidable in said post and pivotally engaging said gate, and a spring bearing against the post and against said bolt, the arrangement being such that the spring normally tilts the gate upwardly and holds it in the open position, substantially as set forth.

3. The combination with a gate and a post, of means by which the gate is supported on the post so as to swing vertically and laterally, a bolt horizontally slidable in said post and having a horizontal eye, a member on the gate pivotally engaging said eye and arranged to slide laterally thereon, and means for forcing said bolt horizontally in a direction such that the gate will be tilted upwardly, substantially as set forth.

In testimony whereof I have signed my name to this specification.

PETER J. ETUE.